United States Patent

Griffin, Jr. et al.

[15] 3,645,671

[45] Feb. 29, 1972

[54] FLUE GAS DESULFURIZATION WITH AMMONIUM SULFITE

[72] Inventors: Lindsay I. Griffin, Jr., Summit; Albert B. Welty, Jr., Westfield, both of N.J.

[73] Assignee: Esso Research and Engineering Company

[22] Filed: Oct. 24, 1969

[21] Appl. No.: 869,226

[52] U.S. Cl. .................................................23/2 SQ, 23/178
[51] Int. Cl. .....................................C01b 17/60, C01c 1/22
[58] Field of Search ........................................23/2, 178, 193

[56] References Cited

UNITED STATES PATENTS

| | | | |
|---|---|---|---|
| 2,021,936 | 11/1935 | Johnstone | 23/2 X |
| 2,676,090 | 4/1954 | Johnstone | 23/2 X |
| 2,405,747 | 8/1946 | Hixson et al. | 23/2 X |
| 3,275,407 | 9/1966 | Furkert et al. | 23/178 X |
| 3,321,275 | 5/1967 | Furkert et al. | 23/178 |

OTHER PUBLICATIONS

Slack, A. V., " Chemical Engineering" December 4, 1967, pp. 191- 92.

Primary Examiner—Oscar R. Vertiz
Assistant Examiner—G. O. Peters
Attorney—Pearlman and Stahl and Louis F. Kreek, Jr.

[57] ABSTRACT

Flue gas is desulfurized by absorption in aqueous ammonium sulfite in a multiple-stage countercurrent absorber. The absorber effluent solution is regenerated by acidifying a portion thereof with ammonium bisulfate to liberate sulfur dioxide decomposing the resulting ammonium sulfate at high temperature by direct contact with hot combustion gases, and by reacting the ammonia thus formed with a second portion of the absorber effluent solution to prepare fresh ammonium sulfite absorbent solution. Regeneration is carried out at constant rate regardless of variations in the flow rates of flue gas and absorbent solution in the absorber; this is accomplished by use of surge tanks for storage of both absorbent and absorber effluent solutions.

8 Claims, 1 Drawing Figure

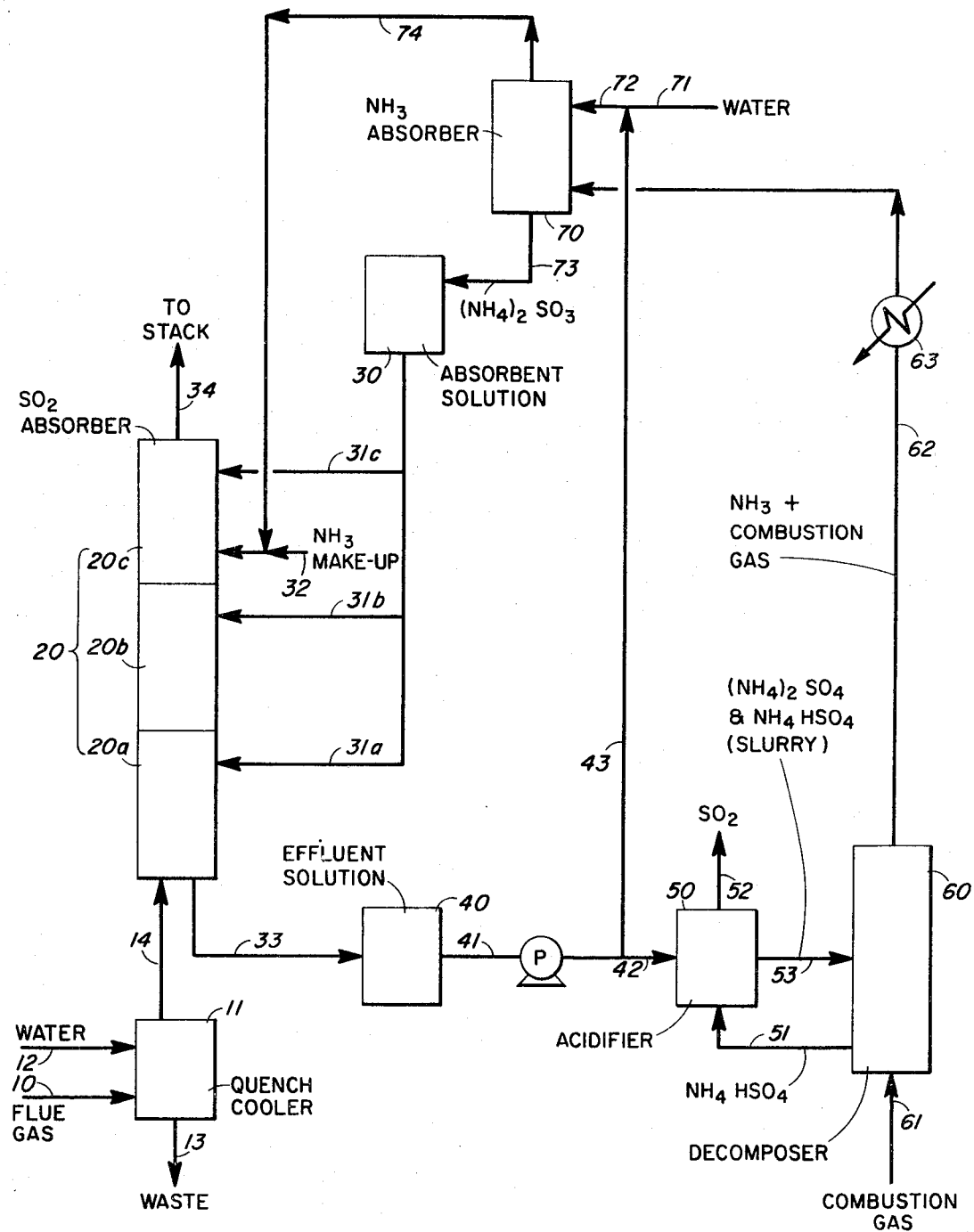

3,645,671

FLUE GAS DESULFURIZATION WITH AMMONIUM SULFITE

BACKGROUND OF THE INVENTION

This invention relates to processes for removal of sulfur dioxide from flue gas, and more particularly to wet processes in which sulfur dioxide is removed b contact with an aqueous absorbent.

Sulfur dioxide has become a major pollutant of the atmosphere, particularly in urban areas. The presence of sulfur dioxide in the atmosphere is due primarily to the combustion of fossil fuels, i.e., coal and oil, which contain sulfur. Electric power plants constitute a major source of sulfur dioxide pollution of the atmosphere.

Various processes have been suggested for removal of sulfur dioxide from flue gas, although none has gained a general industry acceptance to date. These processes may be grouped generally as wet processes and dry processes. Wet processes are those which employ an absorbent solution, usually aqueous, for removal of sulfur dioxide from a gas stream.

A flue gas desulfurization process has several requirements. First, it must be capable of removing most of the sulfur dioxide content of the flue gas, preferably 90 percent or more of the $SO_2$ present, under widely varying load conditions. Second, it should not create any air or water pollution problems. Third, the process should be easy to operate and maintain. The process should have a low net cost. In many instances this would require the production of a salable byproduct. The process should be capable of incorporation into existing power plants if it is to achieve maximum application. This requirement favors wet processes, which operate at a low temperature and therefore can be placed after the conventional air preheater in which incoming air for combustion is heated by the hot flue gas. Dry processes usually require a much higher operating temperature, and therefore must be inserted ahead of the preheater and integrated with the power plant.

Various wet processes have been described in the art, as, for example, those described in Hixson et al., U.S. Pat. No. 2,405,747, issued Aug. 13, 1946, and Johnstone et al., U.S. Pat. No. 2,134,481, issued Oct. 25, 1938. Hixson describes the use of aqueous ammonia as the absorbent. Johnstone et al. uses aqueous ammonium sulfite as the absorbent, and regenerates the scrubber effluent by boiling.

The present invention provides a process which will effectively remove sulfur dioxide from flue gas under widely varying load conditions, which can be installed in existing power plants, and which is simple and economical to operate.

SUMMARY OF THE INVENTION

According to the present invention, sulfur dioxide is removed from flue gas by contacting a flue gas stream in an absorber with an aqueous absorbent solution which is principally ammonium sulfite. A desulfurized flue gas stream and an effluent solution which is principally ammonium bisulfite are withdrawn from the absorber. The absorber effluent is divided into two portions, and one portion is reacted with ammonium bisulfate to liberate sulfur dioxide. The resulting ammonium sulfate, which is in the form of an aqueous slurry, is contacted with hot combustion gases in a decomposer to form molten ammonium bisulfate and ammonia gas. The ammonium bisulfate is returned to the acidifier. The ammonia gas is contacted with the second portion of the ammonium bisulfite effluent solution from the absorber in order to form the ammonium sulfite containing absorbent solution.

THE DRAWING

This invention will now be described in further detail with reference to the accompanying drawing, in which the sole FIGURE is a flow sheet of the process.

DESCRIPTION OF THE PREFERRED EMBODIMENT

This process is generally applicable to treatment of waste gas streams containing sulfur dioxide as an undesired impurity. This invention is especially useful in treating flue gas streams which are formed by combustion of fossil fuels, i.e., coal and oil, which contain sulfur. Such flue gas streams generally contain up to 0.3 percent by volume of sulfur dioxide, some free oxygen due to the use of excess combustion air, and small amounts of fly ash.

The process of this invention includes the steps of (1) absorbing sulfur dioxide in an aqueous absorbent solution which is primarily ammonium sulfite; (2) acidifying a portion of the absorber effluent solution to liberate sulfur dioxide; (3) decomposing the ammonium sulfate formed in step (2) in a stream of hot combustion gas to form ammonia and ammonium bisulfate; and (4) reacting the ammonia with a second portion of the absorber effluent solution to prepare fresh absorbent solution. The principal reactions taking place in these four steps are as follows:

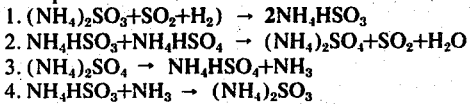

1. $(NH_4)_2SO_3 + SO_2 + H_2) \rightarrow 2NH_4HSO_3$
2. $NH_4HSO_3 + NH_4HSO_4 \rightarrow (NH_4)_2SO_4 + SO_2 + H_2O$
3. $(NH_4)_2SO_4 \rightarrow NH_4HSO_4 + NH_3$
4. $NH_4HSO_3 + NH_3 \rightarrow (NH_4)_2SO_3$ The process will now be described in greater detail with reference to the accompanying drawing.

A flue gas stream 10 containing sulfur dioxide is introduced into a quench cooler and scrubber 11, where the up-flowing flue gas stream is quenched by contact with a down-flowing stream of water introduced through inlet 12. This operation cools and humidifies the flue gas stream and removes solid particles, such as fly ash, which are present in small amounts. Waste water is removed from the bottom of the scrubber via outlet 13. This water may be neutralized and conveyed to a settling pond to permit fly ash to settle out. The flue gas stream, which is substantially saturated with water vapor, is removed through overhead conduit 14.

The flue gas stream flows continuously from overhead line 14 into the bottom of sulfur dioxide absorber 20. This absorber is illustrated herein as a packed tower which contains a conventional packing material such as Raschig rings. Fresh absorbent solution, which is essentially a mixture of aqueous ammonium sulfite and aqueous ammonium bisulfite having a pH greater than 6 but less than 7, is fed from absorbent solution surge tank 30 to absorber 20 via absorbent solution feed lines 31a, 31b and 31c. The use of ammonium sulfite instead of ammonia as the absorbent minimizes loss of ammonia to the atmosphere. Ammonia losses are further reduced by splitting the absorbent solution feed into three portions 31a, 31b and 31c, instead of a single feedstream entering the top of absorber 20. Makeup ammonia, to compensate for losses of ammonia from the system, may be introduced through ammonia makeup inlet pipe 32. The absorbent solution flows down through the tower 20 countercurrent to the flue gas flow, and the entire absorber effluent solution is withdrawn from the bottom of the tower through line 33. This absorber effluent solution is principally ammonium bisulfite. Desulfurized flue gas is withdrawn through flue gas outlet 34, which leads to a stack for discharge of gas to the atmosphere. The desulfurized flue gas typically has a sulfur dioxide content no greater than 10 percent of the original sulfur dioxide content of the entering flue gas.

In order to promote better contact between flue gas and absorbent solution, and to keep the packing wet throughout the tower, it is frequently desired to recirculate a portion of the absorbent solution. Recirculation lines for this purpose have been omitted from the accompanying drawing for the sake of clarity. For recirculation of absorbent liquid, it is desirable to divide the tower 20 into a plurality of stages by means of trays (not shown) which will permit flue gas to pass upwardly through the tower freely but collect the downflowing absorbent solution, and to recirculate a portion of the absorbent solution collected on each tray to the top of the stage while reintroducing the remaining portion of the solution into the next lower stage. Three stages 20a, 20b and 20c are illustrated herein for the purpose of illustration. When the absorption tower 20 is physically divided into separate stages, it is desirable to introduce a portion of the fresh absorbent solution from tank 30 into the upper portion of each stage. This mode of operation is further described in the copending application of Lindsay I. Griffin, Jr., Ser. No. 869,225, now abandoned filed of even date herewith.

Instead of the absorption tower 20, other multiple-stage countercurrent gas-liquid contact devices, such as a series of venturi scrubbers, may be used.

The fresh absorbent solution, or lean solution, in surge tank 30 contains from about 11 to about 17 moles of ammonia per 100 moles of water and from about 6.5 to about 10 moles of sulfur dioxide per 100 moles of water. The absorber effluent solution, a rich solution, in effluent line 33 is primarily aqueous ammonium bisulfite with some ammonium sulfite present; the composition ranges from about 11 to about 18 moles of $NH_3$ per 100 moles of water, and from about 8 to about 16 moles of $SO_2$ per 100 moles of water. The effluent solution preferably contains from about 12 to 16 moles of ammonia and from about 10 to 14 moles of $SO_2$ per 100 moles of water.

As the flue gas rate in absorber 20 varies, the absorbent solution rate is varied proportionately so that the above-described absorbent and absorber effluent solution compositions can be maintained. Considerable variation in the flue gas rate normally occurs in the course of a day at an electric power plant because of varying power requirements.

The absorber 20 is operated at a temperature of about 30° C. (86° F.) to about 75° C. (167° F.) and from substantially atmospheric pressure up to about 5 atmospheres. Preferred operation is from about 35° C. (95° F.) to about 60° C. (140° F.). Pressures over about 5 atmospheres can be used, but the advantages of reduced equipment size and greater solubility of sulfur dioxide are generally outweighed by the disadvantages of high-pressure operation, such as the need for high-pressure equipment. Operation of absorber 20 is essentially isothermal.

The absorber effluent solution which is withdrawn through line 33 (except for a portion which may be recirculated within the lowest stage 20a through recirculation line not shown) is continuously introduced into an absorber effluent solution surge tank 40. Naturally, the rate of introduction of solution into this tank will be highest at peak load times, since the rate at which fresh solution is introduced into absorber 20 is proportional to the flue gas flow rate through absorber 20. In this way, a substantially constant composition of absorber effluent solution is maintained, regardless of variations in load.

The present invention permits the regeneration of the absorber effluent solution to be carried out at a constant flow rate, regardless of the variations of the solution flow rate within the absorber 20. To this end, solution is withdrawn at a constant rate from effluent surge tank 40.

The absorber effluent solution is withdrawn from surge tank 40 through line 41, and is divided into two portions. The first and smaller portion, stream 42, is treated to liberate sulfur dioxide. The second and larger portion, stream 43, is used to prepare fresh absorbent solution.

The absorber effluent solution in line 42 is introduced into an acidifier 50. An excess of ammonium bisulfate is introduced in the molten state into acidifier 50 via line 51. The acidifier 50 is preferably operated at a temperature of about 200° F. to 225° F., and the heat released in the acidifier is supplied principally by the heat content of the molten ammonium bisulfate. Sulfur dioxide is liberated in acidifier 50 by the reaction of ammonium bisulfite and ammonium bisulfate. An appreciable quantity of water is vaporized. A mixture of sulfur dioxide and steam leaves the acidifier 50 via vapor exit line 52. The sulfur dioxide in line 52 may be further processed in order to recover either sulfur or sulfuric acid. When sulfur is desired as a byproduct, the sulfur dioxide-steam mixture in line 52 may be conveyed directly to a Claus plant. When sulfuric acid is desired, the water vapor in line 52 may be separated from the sulfur dioxide by conventional means, and the dry $SO_2$ oxidized to $SO_3$ and converted to sulfuric acid by known means.

Liberation of sulfur dioxide in acidifier 50 results in the formation of ammonium sulfate as a byproduct. Since substantial quantities of water are vaporized, this ammonium sulfate is in the form of an aqueous slurry, which may also contain some unreacted ammonium bisulfate. This slurry has a total solids content (dissolved plus undissolved salts) of about 60 to about 80 percent by weight. The undissolved solids constitute about 15 to 30 percent by weight of the total slurry. Higher concentrations are generally not desirable because they are not fluid enough for easy pumping; lower concentrations are generally not desired because the subsequent decomposition of ammonium sulfate would require excessive amounts of heat to vaporize the water.

The slurry of ammonium sulfate is removed from acidifier 50 through line 53, and is introduced into decomposer 60. The ammonium sulfate slurry is introduced into a stream of hot combustion gases which enter the decomposer 60 from combustion gas inlet line 61. These combustion gases are formed by the combustion of a fossil fuel such as natural gas, fuel oil, or coal. The decomposer 60 is operated at a temperature of about 600° F. to about 900° F., preferably about 700° F. to about 850° F. At this temperature ammonium sulfate is decomposed into molten ammonium bisulfate and ammonia. Temperatures substantially in excess of about 900° F. are avoided since such temperatures would cause further decomposition into sulfur trioxide and additional ammonia, and may even cause some nitrogen and sulfur dioxide to be formed. Molten ammonium bisulfate is withdrawn from the bottom of decomposer 60 through line 51, from which it is introduced into acidifier 50 as previously described. The decomposer 60 is preferably ceramic lined, since the molten salt therein is quite corrosive. In a preferred mode of operation, decomposer 60 is placed at a higher level than acidifier 50, so that the molten ammonium bisulfate in line 51 can flow by gravity, thus obviating the necessity for high-temperature pumps. A gas stream comprising ammonia and combustion gases (i.e., nitrogen, carbon dioxide, and water vapor) is withdrawn from decomposer 60 through overhead line 62. This stream is cooled in cooler 63 prior to removal of the ammonia therefrom.

Cool ammonia-containing gas from line 62 is contacted with absorber effluent solution from line 43 in ammonia absorber 70, in order to make fresh absorbent solution. Absorber 70 may be a conventional packed tower in which the ammonia gas stream and the absorber effluent solution stream flow in countercurrent contact. Additional water is added to absorber 70 as required through line 71; the diluted absorber effluent solution is added to absorber 70 through liquid inlet 72. The ammonia absorber 70 is operated at about the same temperature as the sulfur dioxide absorber 20, i.e., in the range of about 30° C. (86° F.) to about 75° C. (167° F.), and preferably at about 35° C. (95° F.) to about 60° C. (140° F.). Fresh absorbent solution for use in the sulfur dioxide absorber 20 is withdrawn from the bottom of the ammonia absorber 70 through absorbent solution outlet line 73, and is returned to the fresh absorbent solution surge tank 30. A portion of this solution may be recirculated to the top of the ammonia absorber 70 in order to improve gas-liquid contact therein.

The gases from line 62 which are not absorbed in ammonia absorber 70, such as nitrogen and carbon dioxide, are removed from the absorber 70 through overhead line 74. These gases may be introduced into the upper portion of sulfur dioxide absorber 20 and thence vented through overhead line 34 into a stack and thence to the atmosphere.

It will be seen that the acidifier 50, the decomposer 60, and the ammonia absorber 70 are operated at substantially constant flow rates, even though the flow rate of both flue gas and absorbent liquid in absorber 20 may vary widely. This is made possible by the use of ammonium sulfite rather than gaseous ammonia as the absorbent in absorber 20, and by placing surge tanks 30 and 40 for fresh absorbent solution and absorber effluent solution, respectively, between the sulfur dioxide absorber 20 and the rest of the system. Ammonium sulfite can be conveniently stored in surge tank 30 in aqueous solution, while gaseous ammonia would have to be used as it is produced. In times of heavy gas flow through absorber 20, as, for example, when an electric power generating plant which releases flue gas is operating at capacity, fresh solution is withdrawn from tank 30 faster than it is supplied thereto, and effluent solution flows into tank 40 faster than it is withdrawn therefrom. Conversely, at times of low flow rate in absorber 20, e.g., during a low load period in an electric power generating plant, effluent solution is withdrawn from tank 40 greater than it enters therein, and the supply of fresh solution in tank 30 is replenished.

A further advantage of the regeneration system described herein is its low heat requirements. The amount of heat necessary to regenerate the absorbent solution according to this invention is only about 2 percent of the amount of heat liberated in the furnace where the flue gas is formed. The instant regeneration process requires substantially less heat than does boiling of the absorber effluent to recover sulfur dioxide.

To minimize corrosion, it is preferred to use equipment which is made of corrosion resistant alloy, or which is ceramic lined where severe corrosivity is encountered, as, for example, in decomposer 60.

This invention will now be described further with reference to a specific example.

The stream quantities in this example are based on the assumption that 90 percent of the sulfur dioxide content in the flue gas is removed and that equilibrium is reached in all stages of the system. Actually, desulfurization of greater than 90 percent, even as high as 95 percent or more, can be achieved. On the other hand, equilibrium is never fully attained. The stream quantities used in the example which follows are typical of those to be encountered in the desulfurization of the glue gas stream from an 800-megawatt electric power generating plant operating at capacity. EXAMPLE Flue gas containing a small quantity of sulfur dioxide is scrubbed with water vapor in quench cooler 11. Scrubbing quench cools the gas stream and substantially saturates the stream with water vapor. The flue gas stream is passed upwardly through sulfur dioxide absorber 20, where it is contacted with a downflowing stream of aqueous absorbent solution. This solution is essentially ammonium sulfite, with some ammonium bisulfite present, containing typically about 14.0 moles of $NH_3$ and 8.2 moles of $SO_2$ per 100 moles of water and having a pH of 6.5. This absorbent solution is introduced at three points in the absorber 20 via lines 31a, 31b and 31c. Makeup ammonia is added through line 32. Absorber 20 is operated at 122° F. and substantially atmospheric pressure. Desulfurized flue gas is withdrawn overhead via line 34, and absorber effluent solution is withdrawn through line 33 and passed to surge tank 40. The absorber effluent solution is predominantly ammonium bisulfite containing typically about 14.0 moles of $NH_3$ and 11.5 moles of $SO_2$ per 100 moles of water, and having a pH of 5.4.

Absorber effluent solution is withdrawn from surge tank 40 via line 41, and is divided into two streams 42 and 43. Stream 42 flows to acidifier 50, and molten ammonium bisulfate is also introduced into acidifier 50 via line 51. The solution temperature in acidifier 50 is about 200° F. Sulfur dioxide and water vapor are removed overhead via line 52.

An aqueous slurry of ammonium sulfate, with some ammonium bisulfate, containing typically about 15 percent by volume of solids, flows from acidifier 50 to decomposer 60 via line 53. The ammonium sulfate slurry is contacted in decomposer 60 with a hot combustion gas stream entering through line 61, forming molten ammonium bisulfate, which is withdrawn from the decomposer via line 51 and returned to the acidifier 50. The ammonia is entrained in the combustion gas exit stream 62, which flows to the ammonia absorber 70.

Ammonia from line 62 and ammonium bisulfate solution from line 43 are countercurrently contacted in ammonia absorber 70, forming absorbent solution which is primarily ammonium sulfite. This solution is passed from absorber 70 to surge tank 30 via line 73. Solution is withdrawn from surge tank 30 via lines 31a, 31b and 31c, and introduced into the sulfur dioxide absorber as previously described. Combustion gas is withdrawn from absorber 70 via overhead line 74.

Stream quantities in pound moles per hour are shown in Table I below.

TABLE I

Stream quantities in pound moles per hour.
Reference numerals refer to drawing.

| Reference Numeral | Flue Gas | Constituent $SO_2$ | $NH_3$ | $H_2O$ |
|---|---|---|---|---|
| 14 | 229,300 (1) | 541 | | (2) |
| 31a | | 215 | 366 | 2,620 |
| 31b | | 405 | 690 | 4,930 |
| 31c | | 599 | 1,020 | 7,290 |
| 32 | | | 68.9 | |
| 33 | | 1,710 | 2,080 | 14,800 |
| 34 | 233,500 | 54.1 | 68.9 | (2) |
| 42 | | 487 | 593 | 4,240 |
| 43 | | 1,220 | 1,480 | 10,600 |
| 52 | | 487 | | 1,240 |
| 61 | 4,590 (3)(4) | | | |
| 62 | 4,590 (3)(5) | | 593 | 3,000 (6) |
| 71 | | | | 1,240 (7) |
| 73 | | 1,220 | 2,080 | 14,800 |
| 74 | 4,590 (1) | | | (2) |

Notes:

1 Total flow, including $SO_2$.

(2) Essentially saturated.

(3) Combustion gas.

(4) Total flow, including water vapor.

(5) Includes water vapor formed by combustion, but does not include $NH_3$ or water introduced in stream 53.

(6) Includes water from stream 53 only. Does not include water vapor in combustion gas (stream 61).

(7) Water is added as required.

Table II below shows the stream quantities (in pound moles per hour) in streams 51 and 53.

TABLE II

| Constituent | Stream 51 | Stream 53 |
|---|---|---|
| Ammonium bisulfate | 890(1) | 297(2) |
| Ammonium sulfate in solution | | 292 |
| Ammonium sulfate in suspension | | 301 |
| Water | | 3,000 |

Notes:

(1) Molten.

(2) In solution.

While this invention has been described with particular reference to flue gas, other gases containing sulfur dioxide, such as smelter gas from pyrites and other ore-roasting processes, can also be desulfurized according to the present invention.

What is claimed is:

1. A process for removing sulfur dioxide from flue gas which comprises:
    a. introducing a stream of flue gas containing sulfur dioxide into an absorption zone;
    b. withdrawing a fresh aqueous absorbent solution containing ammonium sulfite and ammonium bisulfite and having a pH of about 6 to about 7 from a first tank and introducing said solution into said absorption zone;
    c. contacting said flue gas stream and said absorbent solution in said absorption zone;
    d. withdrawing a flue gas stream of substantially reduced sulfur dioxide content and an effluent solution containing ammonium bisulfite as the principal solute from said absorption zone and introducing effluent solution into a second tank;
    e. withdrawing said effluent solution from said second tank at a substantially constant rate and dividing said effluent solution into two portions;
    f. acidifying the first portion of said absorber effluent solution with ammonium bisulfate, thereby liberating sulfur dioxide and forming ammonium sulfate;
    g. decomposing said ammonium sulfate at elevated temperature into ammonium bisulfate and gaseous ammonia in a decomposition zone;
    h. reacting said gaseous ammonia with the second portion of said absorber effluent solution to prepare fresh aqueous absorbent solution; and
    i. returning said fresh aqueous absorbent solution to said first tank.

2. A process according to claim 1 in which said ammonium bisulfate in step (f) is molten, whereby a substantial quantity of water is vaporized and said ammonium sulfate is formed as an aqueous slurry.

3. A process according to claim 2 in which said aqueous slurry contains from about 15 to about 30 percent by weight of undissolved solids.

4. A process according to claim 1 in which said ammonium sulfate is decomposed at a temperature in the range of about 600° F. to about 900° F.

5. A process according to claim 1 in which said ammonium sulfate is decomposed at a temperature in the range of about 700° F. to about 850° F.

6. A process according to claim 2 in which said aqueous slurry is introduced into said decomposition zone and ammonium sulfate therein is decomposed by contact with hot combustion gases.

7. A process according to claim 1 in which said flue gas stream and said absorbent solution flow at variable rates in said absorption zone, and in which the flow rates in steps (F), (g), and (h) are substantially constant.

8. A process according to claim 1 in which said fresh absorbent solution is introduced into said absorption zone at a rate which is substantially proportional to the rate of flue gas flow through said absorption zone.

* * * * *